United States Patent
Chu et al.

(10) Patent No.: US 9,842,619 B1
(45) Date of Patent: Dec. 12, 2017

(54) SELECTING LASER POWER BASED ON WRITING TO A SET OF CONSECUTIVE USER DATA WEDGES

(71) Applicant: Seagate Technology LLC, Cupertino, CA (US)

(72) Inventors: Alfredo Sam Chu, Prior Lake, MN (US); Wenzhong Zhu, Apple Valley, MN (US); Tim Rausch, Farmington, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/139,432

(22) Filed: Apr. 27, 2016

(51) Int. Cl.
| | |
|---|---|
| *G11B 11/00* | (2006.01) |
| *G11B 7/1267* | (2012.01) |
| *G11B 5/455* | (2006.01) |
| *G11B 20/18* | (2006.01) |
| *G11B 20/10* | (2006.01) |
| *G11B 5/00* | (2006.01) |
| *G11B 20/12* | (2006.01) |

(52) U.S. Cl.
CPC ............ *G11B 7/1267* (2013.01); *G11B 5/455* (2013.01); *G11B 20/10388* (2013.01); *G11B 20/1816* (2013.01); *G11B 2005/0021* (2013.01); *G11B 2020/1275* (2013.01)

(58) Field of Classification Search
None
See application file for complete search history.

(56) References Cited

U.S. PATENT DOCUMENTS

| | | | |
|---|---|---|---|
| 5,341,360 A * | 8/1994 | Johann | G11B 7/126 369/116 |
| 5,513,166 A * | 4/1996 | Tokumitsu | G11B 7/0045 369/53.15 |
| 5,982,714 A | 11/1999 | Koda | |
| 6,278,667 B1 | 8/2001 | Belser | |
| 6,356,515 B1 | 3/2002 | Kumita et al. | |
| 6,525,892 B1 | 2/2003 | Dunbar et al. | |
| 7,099,251 B2 | 8/2006 | Naoi et al. | |
| 7,990,647 B2 | 8/2011 | Lille | |
| 8,760,779 B2 | 6/2014 | Johns et al. | |
| 8,854,929 B1 | 10/2014 | Champion et al. | |
| 9,093,091 B1 * | 7/2015 | Chu | G11B 5/314 369/13.27 |
| 9,099,103 B1 | 8/2015 | Krichevsky | |
| 9,240,205 B1 | 1/2016 | Gao et al. | |
| 9,361,920 B1 * | 6/2016 | Zhu | G11B 5/5565 369/13.27 |
| 9,472,219 B1 * | 10/2016 | Raghunathan | G11B 20/10388 369/13.27 |
| 2005/0030863 A1 | 2/2005 | Masui | |

(Continued)

OTHER PUBLICATIONS

U.S. Appl. No. 14/624,089, Ma et al., filed Feb. 17, 2015.
File History for U.S. Appl. No. 14/624,089.

*Primary Examiner* — Tan X Dinh
(74) *Attorney, Agent, or Firm* — Hollingsworth Davis, LLC

(57) ABSTRACT

A set of consecutive user data wedges are each located between consecutive servo wedges of a heat-assisted recording medium. Test data is written at least every other one of the consecutive data wedges using different laser power values. Based on reading the test data, a nominal laser power is selected for use by the read/write head.

12 Claims, 9 Drawing Sheets

(56) References Cited

U.S. PATENT DOCUMENTS

| | | |
|---|---|---|
| 2006/0117333 A1 | 6/2006 | Taguchi et al. |
| 2007/0230012 A1 | 10/2007 | Erden et al. |
| 2010/0083295 A1* | 4/2010 | Eto ................... G11B 7/00736 720/695 |
| 2011/0205861 A1* | 8/2011 | Erden ...................... G11B 5/02 369/13.27 |
| 2013/0176835 A1 | 7/2013 | Yamada et al. |
| 2014/0119164 A1 | 5/2014 | Wilson et al. |

* cited by examiner

SELECTING LASER POWER BASED ON WRITING TO A SET OF CONSECUTIVE USER DATA WEDGES

SUMMARY

The present disclosure is directed to selecting laser power based on writing to a set of consecutive user data wedges. In one embodiment, a set of consecutive user data wedges of a track of a heat-assisted recording medium is selected. The consecutive user data wedges are each located between consecutive servo wedges. Test data is written at least every other one of the consecutive data wedges using different laser power values. Based on reading the test data, a nominal laser power is selected for use by the read/write head.

In another embodiment, for each of a plurality of consecutive user data wedges each located between consecutive servo wedges, test data is written at a respective plurality of different laser power values of a read/write head. Based on reading the test data, a nominal laser power for use by the read/write head is selected.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
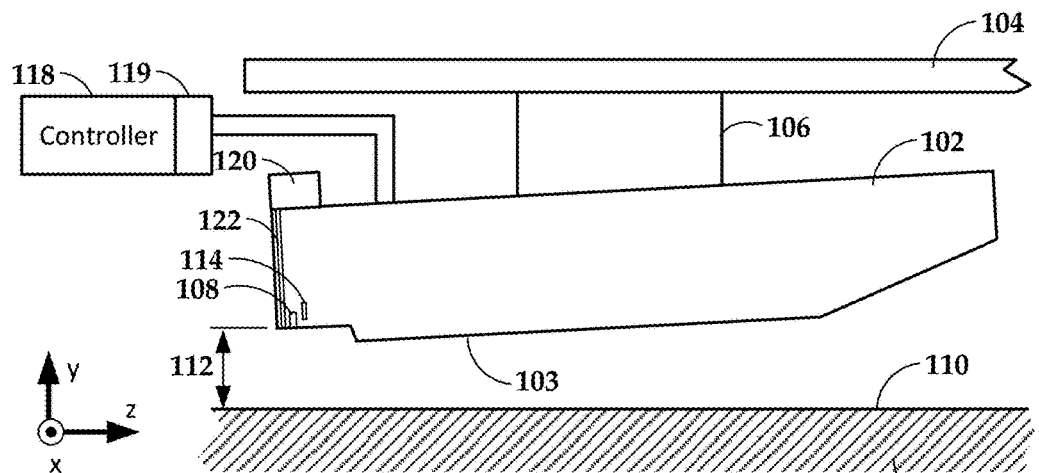
FIG. 1 is a block diagram of a hard disk drive slider and media arrangement according to an example embodiment.

The present disclosure generally relates to data storage devices that utilize magnetic storage media, e.g., disks. In some embodiments below, the devices use heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head.

Generally, the NFT is formed by depositing a thin-film of material such as gold, silver, copper, etc., a region of near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium to form a hot spot used during recording.

In a HAMR drive, a number of performance criteria (e.g., areal density, track width, bit error rate) are affected by the size and the intensity of the hotspot created via the NFT. To control at least the size of the hotspot, one variable that can be changed by drive control systems is power supplied to the laser (or other energy device). In the factory, the setting of the laser power (e.g., current) to an optimal level is one of the earlier calibrations performed, as subsequent testing that involves writing to the recording medium will require the laser to be operating properly to heat the recording medium, e.g., for writing test data.

In the factory process, thousands of drives may be tested on a daily basis, and so there are benefits in reducing the time needed to perform laser calibration. In the field when the laser current needs to be re-calibrated (e.g., due to the NFT and/or laser diode aging), it is also beneficial to reduce the time to perform the current re-optimization, as this can impact availability of the drive. In this disclosure, methods and apparatuses are described to optimize laser power by using a different laser power to write different sequential parts of a track. For example, different laser current may be used for writing each data wedge around the track, to write each short sector after every servo sector, and/or to write every other wedge around a track.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred to herein as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more clearance actuators 114 (e.g., heaters) are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

Figure 2:
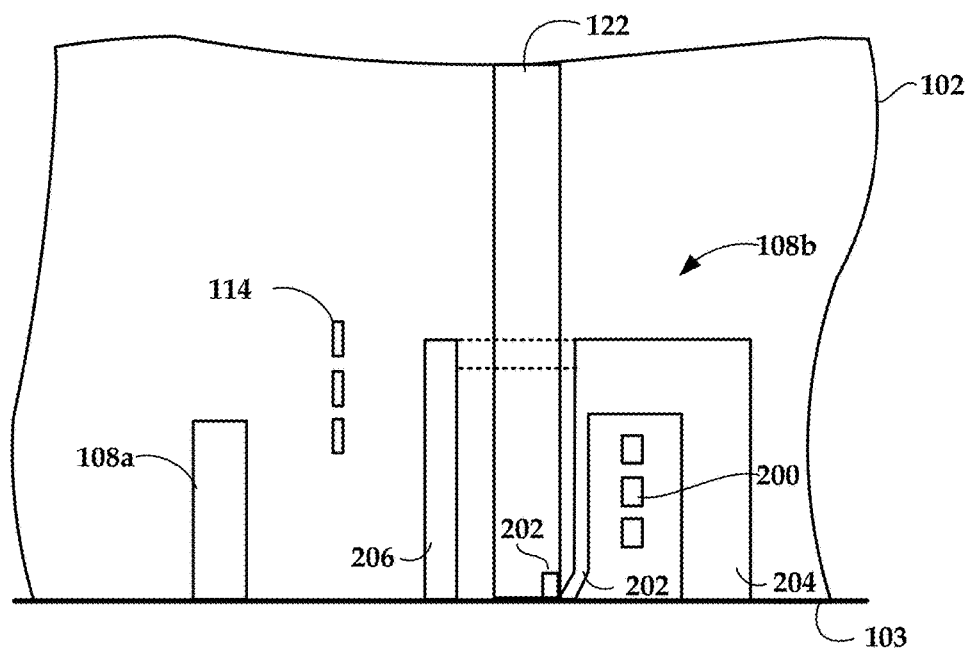
FIG. 2 is a cross-sectional view of a read/write head according to an example embodiment.

The illustrated read/write head 102 is configured as a HAMR device, and so includes additional components that form a hot spot on the recording medium 111 near the read/write transducer 108. These components include a laser 120 (or other energy source) and a waveguide 122. The waveguide 122 delivers light from the laser 120 to components near the read/write transducers 108. These components are shown in greater detail in FIG. 2, which is a block diagram illustrating a cross-sectional view of the read/write head 102 near the read/write transducers 108 according to an example embodiment.

A read transducer 108a is located downtrack from a write transducer 108b. The read transducer 108a may be configured as a magnetoresistive stack (e.g., giant magnetoresistive, tunnel magnetoresistive, etc.) surrounded by magnetic shields. The write transducer 108b includes a coil 200 that, when energized, induces magnetic flux through a write pole 202 and return poles 204, 206. The aforementioned waveguide 122 delivers light to an NFT 202 located near the write pole 202.

In a HAMR write head, one approach to setting laser current values is to write data to the recording medium at different power levels, e.g., changing inputs to a digital-to-analog converter (DAC) that sets current levels applied to the laser via a preamplifier. After writing data to the recording medium, the data is read back to find an optimal current, e.g., a minimum amount of laser current that provides desired characteristic such as amplitude, bit-error-rate (BER), adjacent track erasure, etc. In order to try as many settings as possible in the least amount of time, a method and apparatus as described below sets a plurality of different laser currents within a single track.

Figure 3:
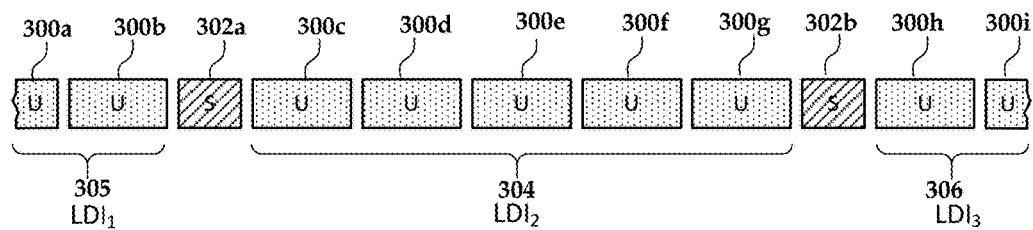
FIGS. 3, 4A, 4B, and 5 are block diagrams showing portions of test tracks according to example embodiments.

An example embodiment writing test data at different laser power levels is shown in the block diagram of FIG. 3. In this diagram, data sectors 300a-i are arranged between servo marks 302a-b. For purposes of this disclosure, the region between two servo marks will be referred to as a wedge or user data wedge. A wedge may contain more than one sector (e.g., for small sectors such as 512 byte sectors) or a sector may encompass multiple wedges (e.g., for large sectors such as 4096 byte sectors). In this example, one full wedge 304 and two partial wedges 305, 306 are shown, and each wedge has five user data sectors 300c-300g for purposes of illustration. In practice, a different number of sectors (including partial sectors) may be arranged between servo marks, and the number of sectors-per-wedge may vary based on the radial distance of the track from the center of the disk.

The servo marks 302a-b contain data used by the servo control system to accurately position the read/write head over a track. The servo marks 302a-b are prewritten onto the disk during manufacturing, and the drive is programmed to ensure that the servo marks aren't overwritten during use. The data sectors 300a-i include written user data, and may correspond to a logical sector/address used by a host. As indicated by the laser diode current values $LDI_1$-$LDI_3$, the data is written to each wedge 304-306 using a different laser current. This may also involve adjusting, for each wedge 304-306, a clearance actuator (e.g., an embedded heater) to compensate for changes in laser-induced protrusion at the different laser current levels. Any data (e.g., a 2T tone, 3T tone, multi-frequency tone) may be written to the wedges 304-306, and reading back the data will provide a data point for each wedge from which to determine the optimum laser current levels.

Once an optimal laser power is found in this and other examples below, it may be used as a nominal laser power, e.g., defines a nominal current setting used for recording data via the read/write head. Note that the actual laser current may change based on operating conditions, e.g., ambient temperature, localized heating, zone being recorded. As such, a laser control system may define a nominal current at a predefined operating point, then make adjustments to the laser current based on present operating conditions.

Figure 4A:
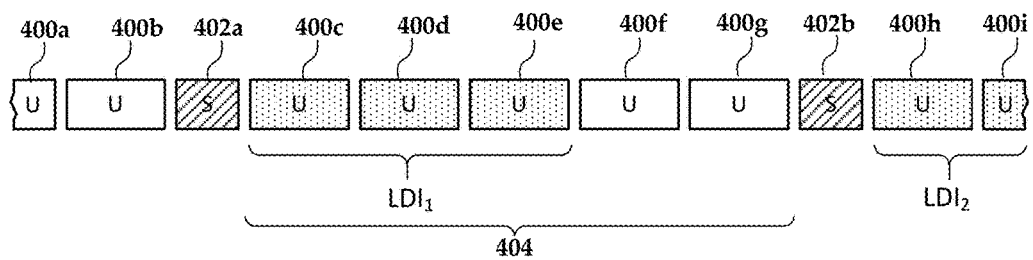
Figure 4B:
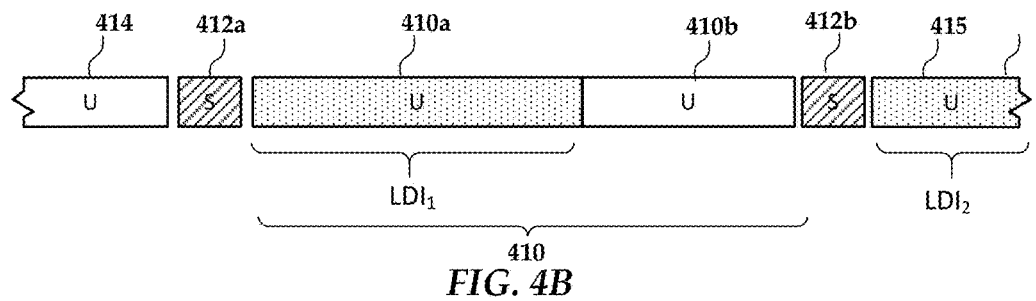
Figure 5:
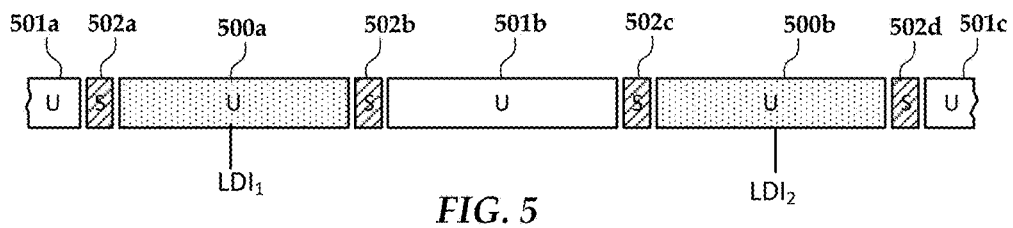

In the example shown in FIG. 3, it is assumed there is no write coupling interference when writing and programming the preamplifier registers for the next level while writing at a current level. If there is write coupling interference, test data may be written as shown in FIGS. 4A, 4B, and 5, which are block diagrams of test data according to other example embodiments. In FIG. 4A, user data sectors 400a-i are written between servo marks 402a-b. User data sectors 400c-e of wedge 404 are written using laser current level $LDI_1$ and at least the laser is turned off while traversing sectors 400f-g. Other components may also be turned off while traversing sectors 400f-g, such as write coil and write heater. This is repeated for prior and/or subsequent wedges, e.g., sectors 400h-i of the next wedge are written using laser current level $LDI_2$ and at least the laser is turned off while traversing prior sectors 400a-b. The time spent traversing unwritten sectors (e.g., sectors 400a-b and 400f-g) can be used to update the preamp registers that control the laser current and heater power.

In FIG. 4B, the writer is set up for a data partition track format referred to as single-sector-per-wedge format. In this format, each wedge (e.g., wedge 410) between servo marks (e.g., servo marks 412a-b) encompasses a single sector (or less than one sector). Portion 410a of wedge 410 is written using laser current level $LDI_1$ and at least the laser is turned off while traversing portion 410b. Other components may also be turned off while traversing portion 410b, such as write coil and write heater. This is repeated for prior and/or subsequent wedges, e.g., the first part of the next wedge 415 is written using laser current level $LDI_2$ and at least the laser is turned off while traversing the last part of previous wedge 414. The time spent traversing unwritten wedge portions can be used to update the preamp registers that control the laser current and heater power.

In both FIGS. 4A and 4B, a beginning portion of each of the wedges is written with data and an ending portion of each of the wedges is not written to. It will understood that other portions may be written. For example, the beginning portion of each wedge may be not written to while the ending portion is written to. In such a case, the laser current for the ending portion may be set while traversing the beginning portion. In other embodiments a middle portion of each wedge may be written to, and adjacent beginning and ending portions are not written to.

In the example shown FIG. 5, user data wedges 500a-b and 501a-c are located between servo marks 502a-d. The wedges 500a-b and 501a-c may include multiple sectors or be configured as super-sectors. Wedges 500a-b are written using laser current levels $LDI_1$ and $LDI_2$, respectively. At least the laser is turned off while traversing wedges 501a-c that are interleaved between wedges 500a-b. Other components may also be turned off while traversing wedges 501a-c, such as write coil and write heater. This is repeated for subsequent wedges, e.g., alternating between writing wedges between two servo marks then skipping writing for the adjacent wedge between the next two servo marks. The time spent traversing unwritten wedges 501a-c can be used to update the preamp registers that control the laser current and heater power.

Figure 6:
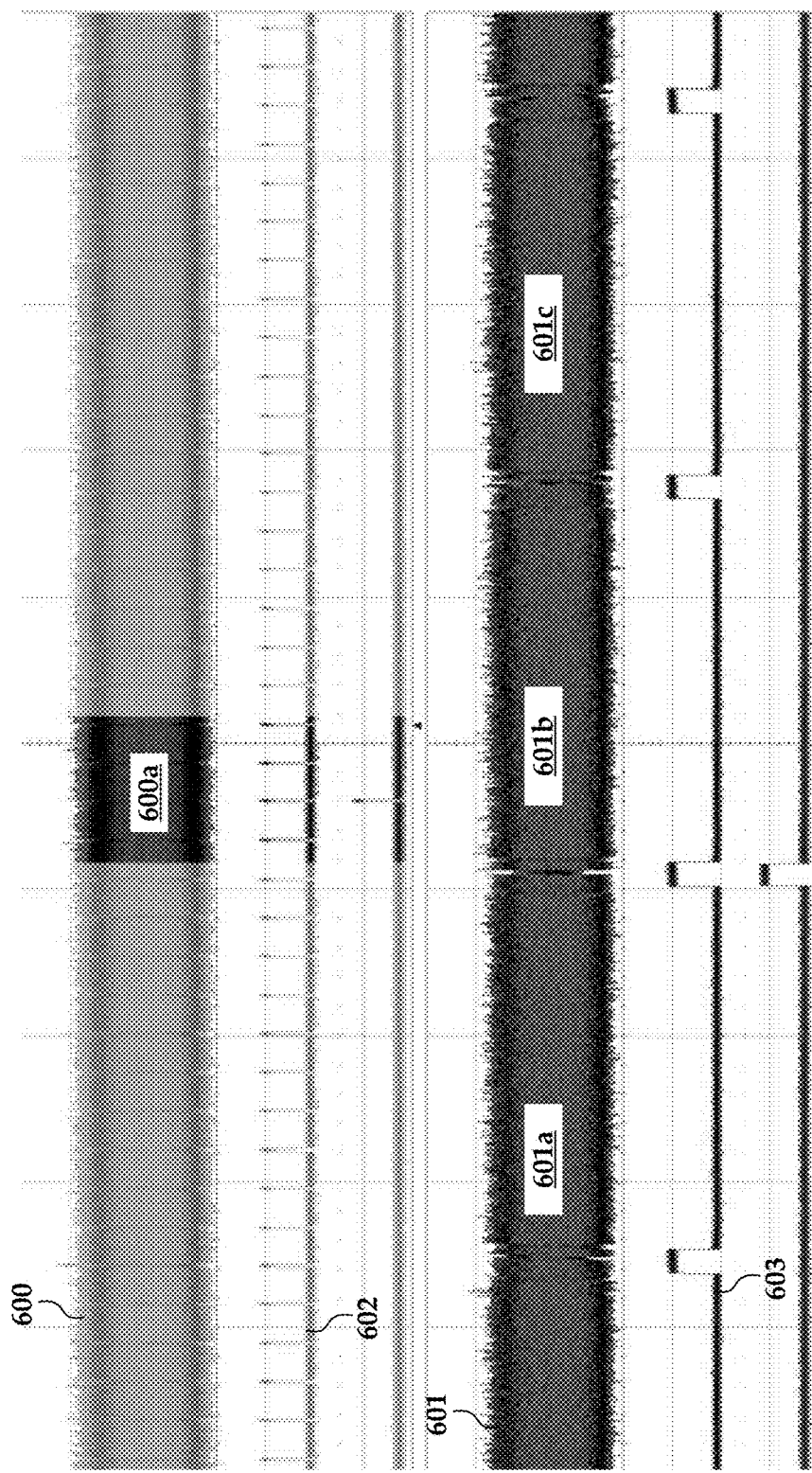
FIGS. 6-9 are oscilloscope plots showing signals used for test tracks according to example embodiments.

In FIG. 6, an oscilloscope output screen shows an example of writing test data according to an example embodiment. This example generally corresponds to the example track shown block diagram of FIG. 3. Traces 600 and 601 represent data signals written to a track, trace 601 being an expanded view of portion 600a of trace 600. Similarly, traces 602 and 603 represent servo data signals, trace 603 being an expanded view of trace 602. The laser current is different when writing each portion 601a-b (each which correspond to a wedge), and may be changed multiple times within portions 601a-b.

Figure 7:
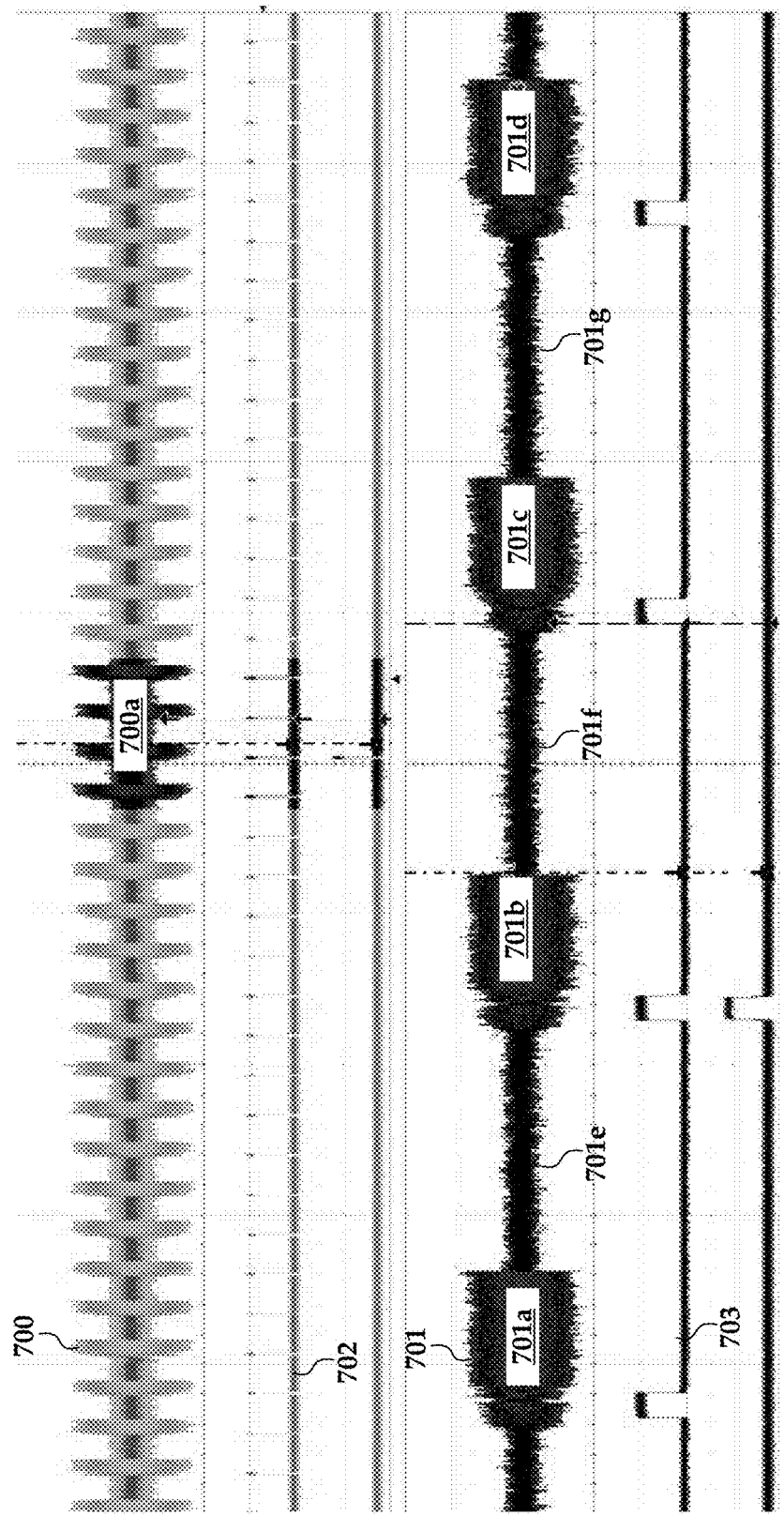

In FIG. 7, an oscilloscope output screen shows an example of writing test data according to another example embodiment. This example generally corresponds to the example track shown block diagram of FIGS. 4A and 4B. Traces 700 and 701 represent data signals written to a track, trace 701 being an expanded view of portion 700a of trace 700. Similarly, traces 702 and 703 represent servo data signals, trace 703 being an expanded view of trace 702. The laser current is different when writing each portion 701a-d, and at least the laser is turned off when traversing portions 701e-g, each portion corresponding to one or more second wedges. Adjacent portions between servo marks (e.g., portions 701b and 701f) encompass a single wedge.

Figure 8:
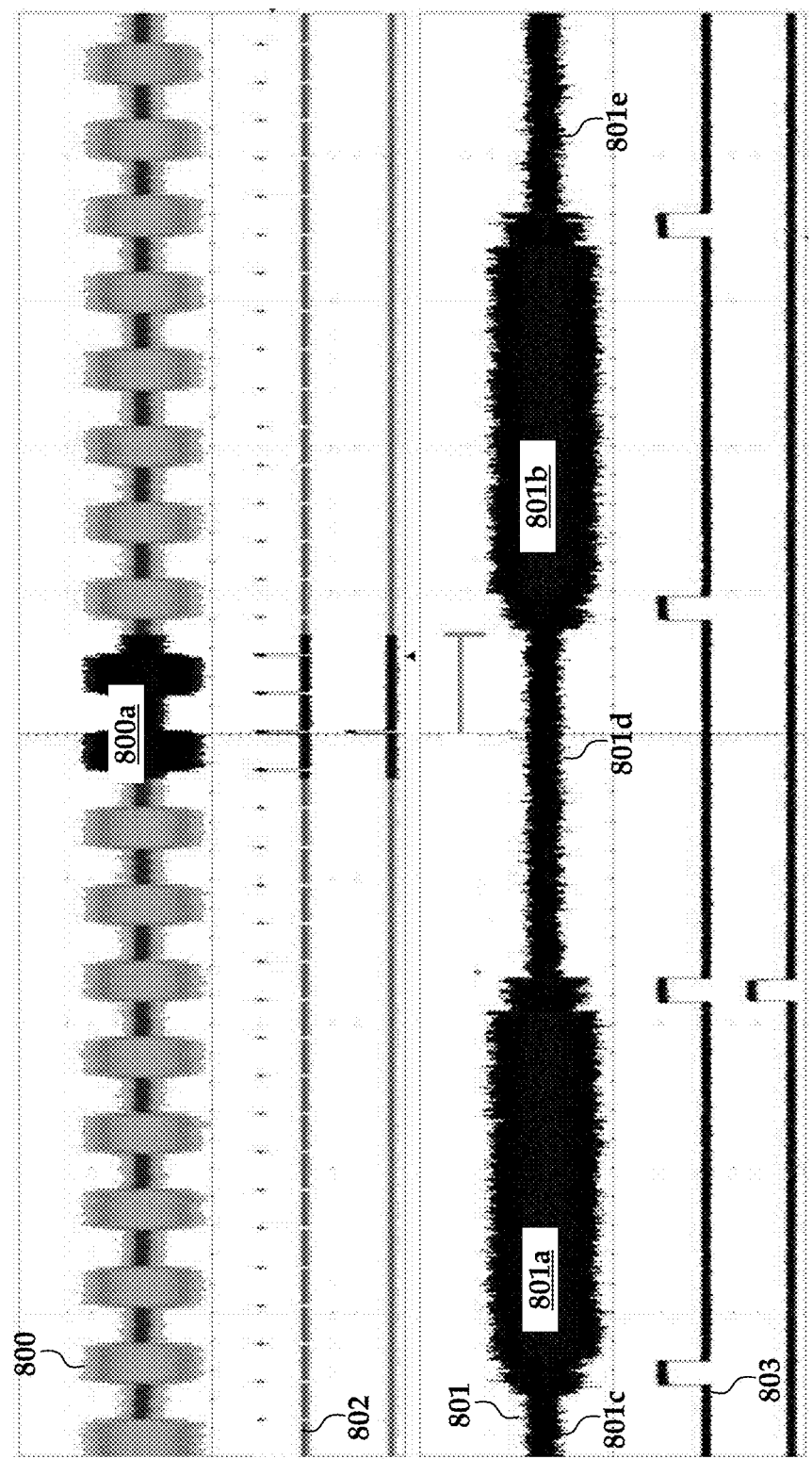

In FIG. 8, an oscilloscope output screen shows an example of writing test data according to another example embodiment. This example generally corresponds to the example track shown block diagram of FIG. 5. Traces 800 and 801 represent data signals written to a track, trace 801 being an expanded view of portion 800a of trace 800. Similarly, traces 802 and 803 represent servo data signals, trace 803 being an expanded view of trace 802. The laser current is different when writing portions 801a-b, each portion corresponding to a first wedge. At least the laser is turned off when traversing portions 801c-e, each portion corresponding to a second wedge.

Figure 9:
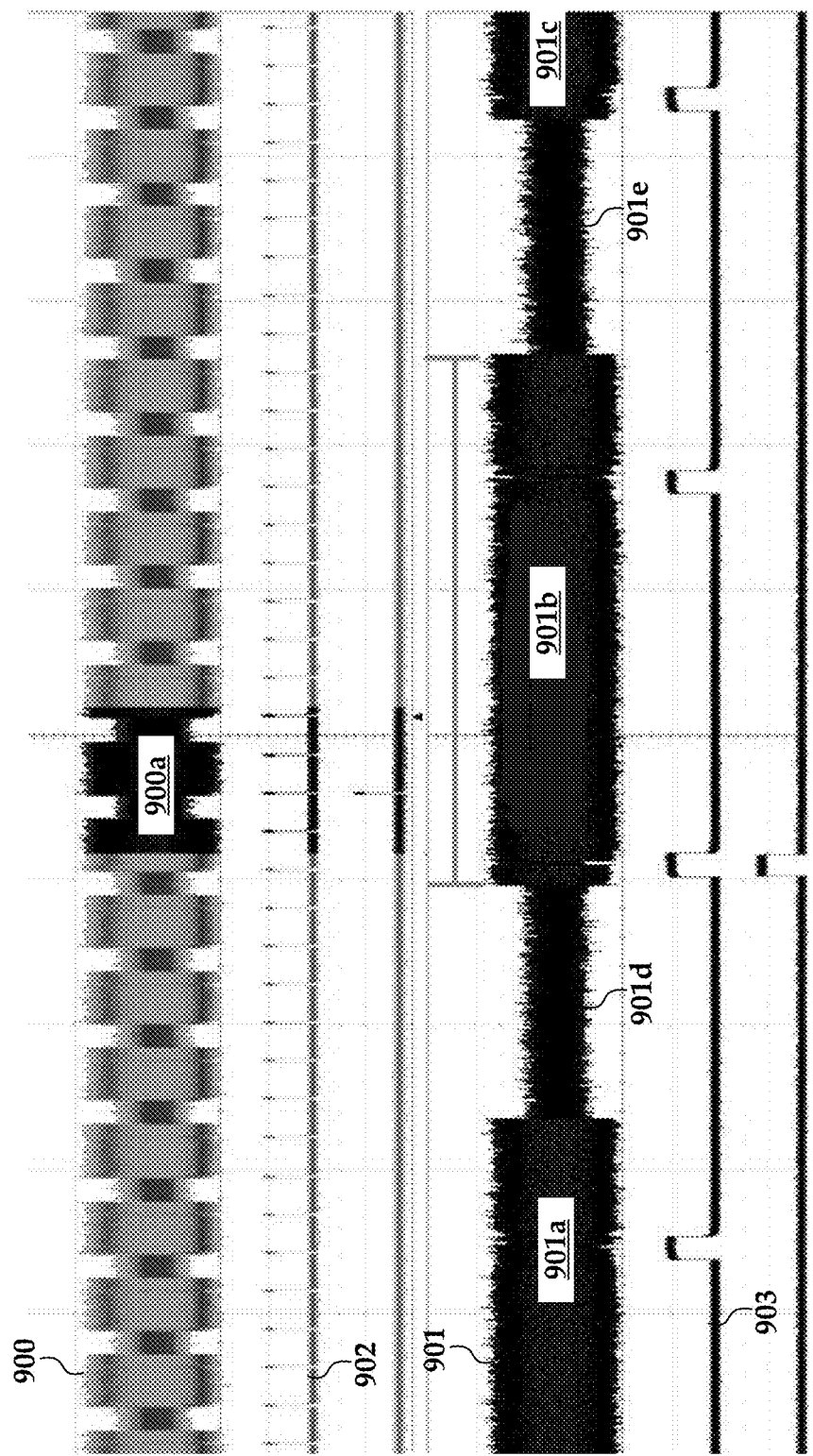

In FIG. 9, an oscilloscope output screen shows an example of writing test data according to another example embodiment. This example involves writing a sector that is longer than a wedge, e.g., a single-sector-per-wedge, 4K sector-size partition format. Traces 900 and 901 represent data signals written to a track, trace 901 being an expanded view of portion 900a of trace 900. Similarly, traces 902 and 903 represent servo data signals, trace 903 being an expanded view of trace 902. The laser current is different when writing portions 901a-b, each portion being larger than a single wedge. At least the laser is turned off when traversing portions 901d-e, each portion 901e-d smaller than a single wedge.

Figure 10:
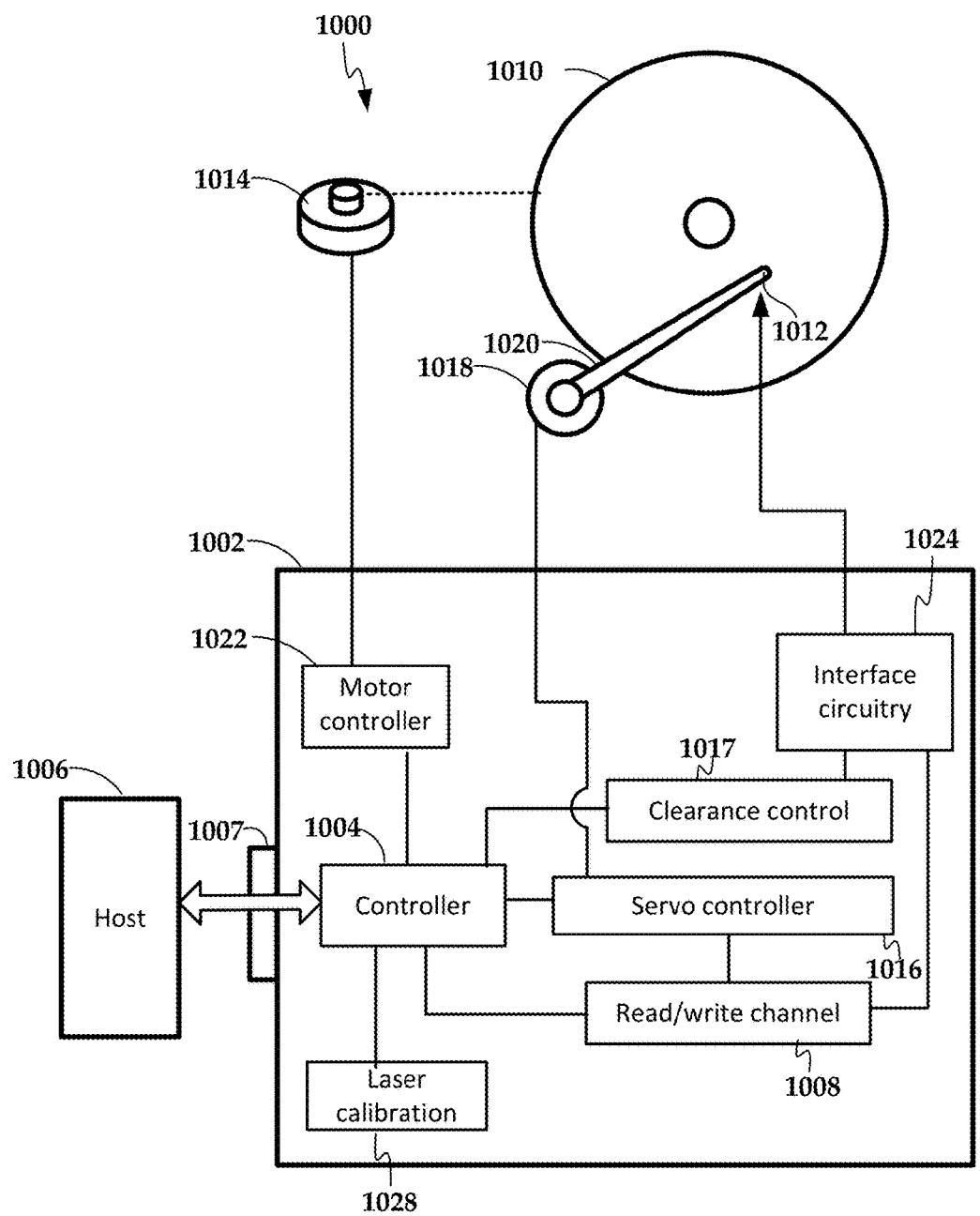
FIG. 10 is a block diagram of an apparatus and system according to an example embodiment.

Generally, the methods described above may be performed in any apparatus that utilizes a HAMR writer and recording medium, including hard disk drives and test stands. In reference now to FIG. 10, a block diagram illustrates components of system 1000 according to an example embodiment. The system 1000 includes a HAMR hard drive apparatus 1002 having to one or more read/write heads 1012. The apparatus 1002 includes a system controller 1004 that controls a number of functions of the system 1000, such as communications between the apparatus 1002 and a host device 1006 via a host interface 1007. The host device 1006 may include any electronic device that can be communicatively coupled to communicate with the apparatus 1002, e.g., a general-purpose computer, a factory test apparatus, remote terminal, etc.

The system controller 1004 may include any combination of custom logic circuits, application specific integrated circuits (ASICs), general-purpose central processing unit (CPU), interface circuits, etc., and may utilize instructions stored as firmware and/or software. The system controller 1004 may process instructions to read data from and write data to a recording medium (e.g., disk 1010) via a read/write channel 1008. The system controller 1004 may, among other things, determine a location on the disk 1010 for the desired data, move the heads to the location (track) of the data, read or write the data via the read/write channel 1008, correct errors, transfer the data to/from the host 1006, etc.

The read/write channel 1008 converts data between the digital signals processed by the data controller 1004 and the analog signals conducted through read/write heads 1012. The read/write channel 1008 also provides servo data read from the disk 1010 to a servo controller 1016. The servo controller 1016 uses these signals to drive an actuator 1018 (e.g., voice coil motor) that rotates an arm 1020, upon which the read/write heads 1012 are mounted. The heads 1012 are moved radially across different tracks of the disk(s) 1010 by the actuator motor 1018 (e.g., voice coil motor), while a spindle motor 1014 rotates the disk(s) 1010. A microactuator (not shown) may also be included to provide finer tracking control, and also receives inputs from the servo controller 1016. The controller 1004 controls the spindle motor 1014 by way of a motor controller 1022.

During write operations, the read/write channel 1008 provides analog signals that are delivered to the read/write heads 1012 by way of interface circuitry 1024. The interface circuitry 1024 include hardware components (preamplifiers, filters, analog-to-digital converters, digital-to-analog converters) that conditions the signals sent to and received from the read/write heads 1012. In the illustrated embodiment, the interface circuitry 1024 also includes laser control circuitry that energizes a laser (or other energy source) at each of the read/write heads 1012 during write operations. The laser control circuitry conditions the signals to ensure the lasers provide sufficient energy to heat a spot on the disk 1010 as it is being recorded. Other signals sent to or received from the read/write head 1012 may also be conditioned via the preamplifier, such as heater control signals, sensor signals, etc. For example, a clearance control module 1017 may read sensor data from the read/write heads 1012 (e.g., DETCR sensor data) to determine current clearance, and modify a signal applied to a heater of the read/write heads 1012 to adjust the clearance accordingly.

A laser calibration module 1028 may perform data collection and testing as described above. For example, the laser calibration module 1028 may select a set of consecutive user data wedges of a track of the heat-assisted recording medium 1010. The consecutive user data wedges are each located between consecutive servo wedges. A set of the wedges is written to at a respective plurality of different laser power values of the read/write head 1012. The set of wedges includes at least every other one of the consecutive data wedges, and may include all of them. The laser calibration module 1028 reads the test data from each of the set of wedges via the read/write head 1012 and selects a nominal laser power for use by the read/write head 1012 based on reading the test data. For example, a wedge having maximum amplitude, minimum BER, etc. may be found, and the laser power used to write that wedge is selected as a nominal laser power. A representation of the nominal laser power (e.g., a DAC value that provides a particular current via a preamplifier) can be stored in persistent memory of the apparatus 1002 and used for write operations.

Figure 11:
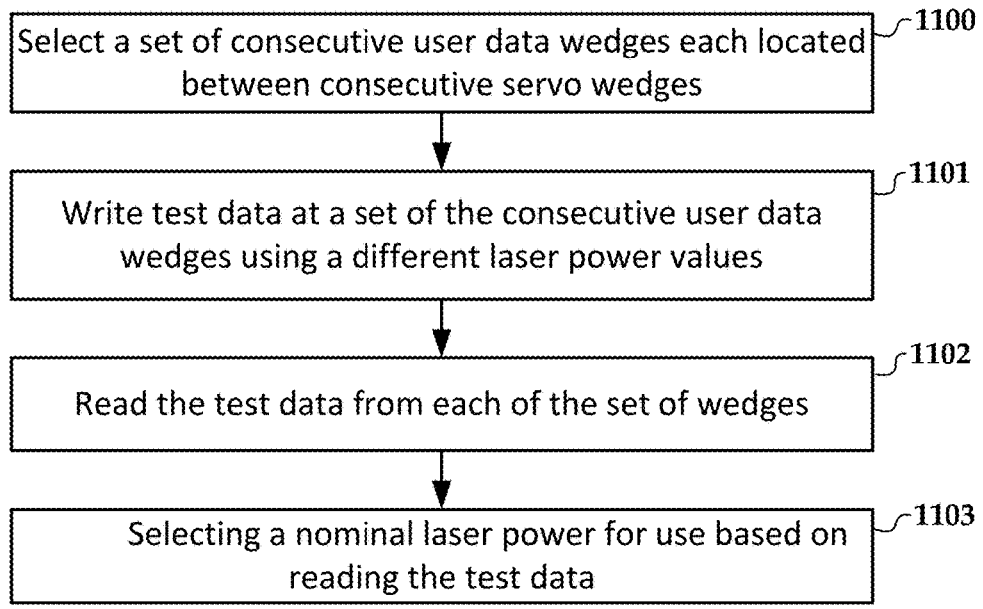
FIGS. 11 and 12 are flowcharts of methods according to example embodiments.

In FIG. 11, a flowchart illustrates a method according to another example embodiment. The method involves selecting 1100 a set of consecutive user data wedges of a track of a heat-assisted recording medium. The consecutive user data wedges are each located between consecutive servo wedges. Test data is written 1101 at a set of the consecutive user data wedges using a plurality of different laser power values of a read/write head. The set of wedges includes at least every other one of the consecutive data wedges. The test data is read from each of the set of wedges via the read/write head. A nominal laser power is selected 1103 for use by the read/write head based on reading the test data.

Figure 12:
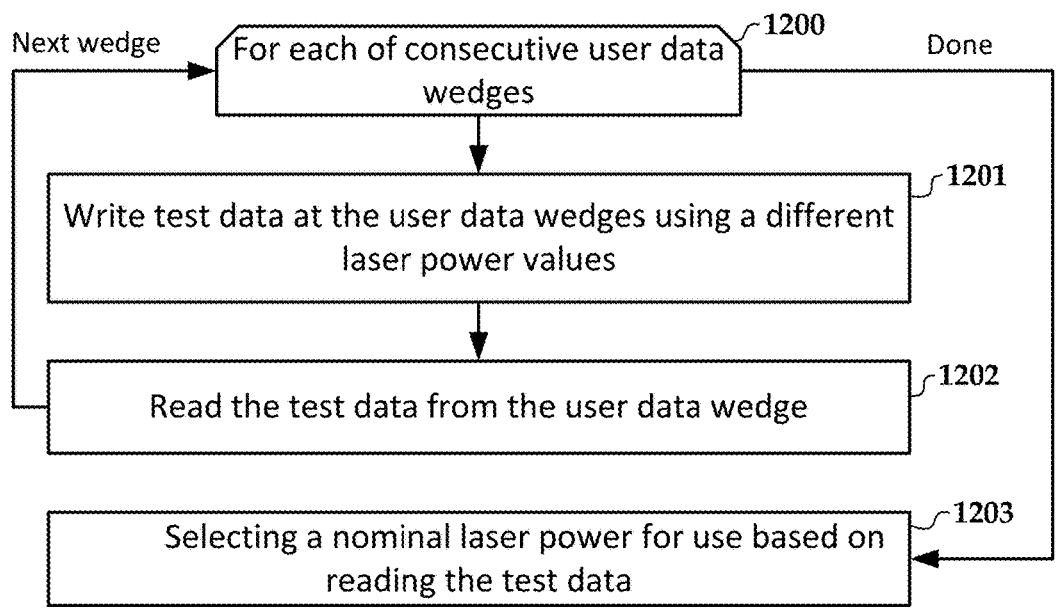

In FIG. 12, a flowchart illustrates a method according to another example embodiment. The method involves iterating through a plurality of consecutive user data wedges each located between consecutive servo wedges, the iteration represented by loop limit block 1200. For each iteration, test data is written 1201 at a respective plurality of different laser power values of a read/write head, and the test data is read from each of the user data wedges. After completion of the iteration, a nominal laser power is selected 1203 for use by the read/write head based on the test data.

Figure 13:
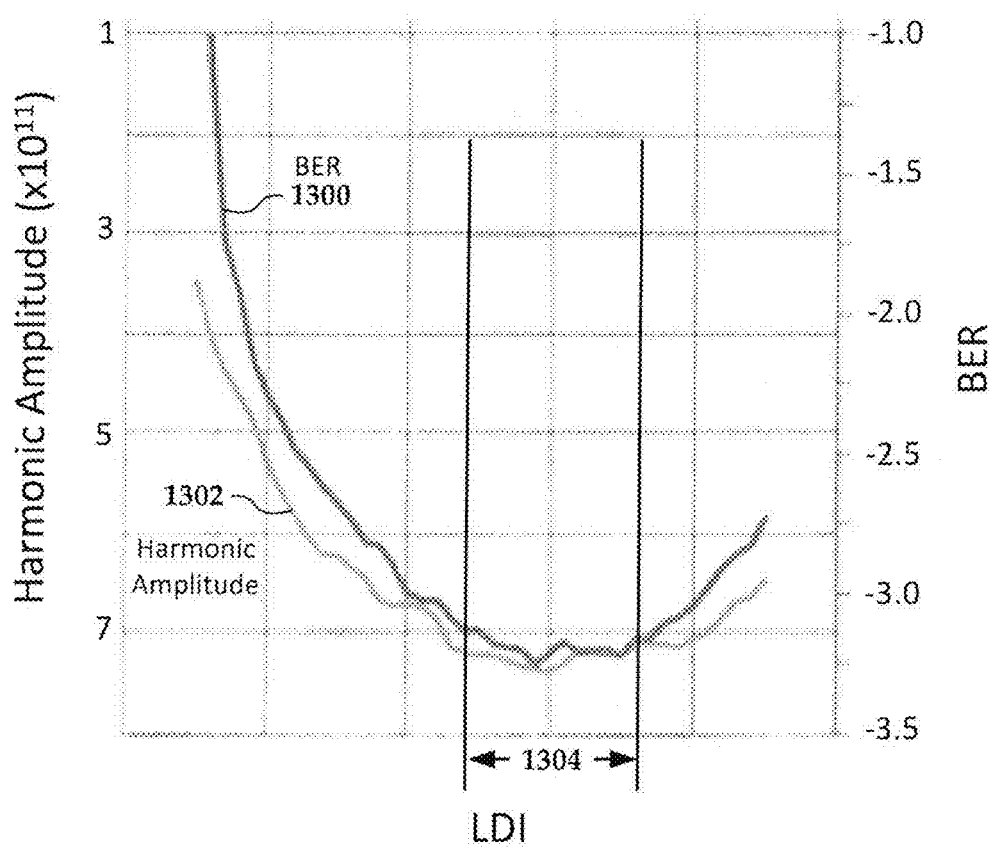
FIG. 13 is a graph showing the selection of laser power according to an example embodiment.

In blocks 1103 and 1203 of FIGS. 11 and 12, a laser power is selected based on reading back test data recording at different power levels. As noted above, this may involve reading data such as BER or amplitude as a function of laser power. In FIG. 13, a graph shows an example of data that may be used to select nominal laser power. Trace 1300 is BER versus nominal laser power (LDI) and trace 1302 is harmonic amplitude versus LDI. The left hand axis shows values harmonic amplitude and increases from top to bottom. The right hand axis shows values of BER of and increases from bottom to top. Note that both curves 1300, 1302 show optimum LDI in range 1304.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
    selecting a set of consecutive user data wedges within a single track of a heat-assisted recording medium, the consecutive user data wedges each located between consecutive servo marks;
    writing test data to a first portion of all of the consecutive user data wedges using different laser power values of a read/write head for each, wherein a next laser power is set in a laser preamplifier while a second portion of each user data wedge is not being written to;
    reading the test data from the consecutive user data wedges via the read/write head; and
    selecting a nominal laser power for use by the read/write head based on reading the test data.

2. The method of claim 1, wherein writing the test data comprises using a single-sector-per-wedge data partition track format type.

3. A method, comprising:
    selecting a set of consecutive user data wedges within a single track of a heat-assisted recording medium the consecutive user data wedges each located between consecutive servo marks,
    writing test data to only every other one of the user data wedges using different laser power values of a read/write head for each of the user data wedges, wherein no data is written and a next laser power is set in a laser preamplifier while traversing the user data wedges between the every other one of the user data wedges;
    reading the test data from the every other one of the consecutive user data wedges via the read/write head; and
    selecting a nominal laser power for use by the read/write head based on reading the test data.

4. The method of in the method is performed during a factory calibration.

5. The method of claim 1, wherein the method is performed during end-user operation of a drive that comprises the read/write head and the heat-assisted recording medium.

6. A method; comprising:
    for each of a plurality of consecutive user data wedges each located between consecutive servo marks within a single track of heat-assisted recording medium, writing test data at a respective plurality of different laser power values of a read/write head for each of the consecutive user data wedges, wherein writing the test data comprises writing the test data over a first portion of each user data wedge and not writing while traversing a second portion of each user data wedge, the method further comprising setting a next laser power for a next of the user data wedges while the second portion is being traversed;

reading the test data from each of the user data wedges; and selecting a nominal laser power for use by the read/write head based on reading the test data.

7. The method of claim 6, wherein writing the test data comprises using a single-sector-per-wedge data partition track format type.

8. An apparatus, comprising:

circuitry configured to communicate with a read/write head that writes to a heat-assisted recording medium; and a processor coupled to the circuitry and configured to perform a method comprising:

selecting a set of consecutive user data wedges within a single track of the heat-assisted recording medium; the consecutive user data wedges each located between consecutive servo marks;

writing test data to a first portion of all of the consecutive user data wedges using different laser power values of a read/write head for each, wherein a next laser power is set in a laser preamplifier while a second portion of each user data wedge is not being written to;

reading the test data from the consecutive user data wedges via the read/write head; and selecting a nominal laser power for use by the read/write head based on reading the test data.

9. The apparatus of claim 8, wherein writing the test data comprises using a single-sector-per-wedge data partition track format type.

10. An apparatus comprising:

circuitry configured to communicate with a read/write head that writes to a heat-assisted recording medium; and a processor coupled to the circuitry and configured to perform a method comprising:

selecting a set of consecutive user data wedges within a single track of the heat-assisted recording medium, the consecutive user data wedges each located between consecutive servo marks;

writing test data to only every other one of the consecutive user data wedges using different laser power values of a read/write head for each of the user data wedges, wherein no data is written and a next laser power is set in a laser preamplifier while traversing the user data wedges between the every other one of the user data wedges;

reading the test data from the every other one of the consecutive user data wedges via the read/write head; and selecting a nominal laser power for use by the read/write head based on reading the test data.

11. The apparatus of claim 8, wherein the method is performed during a factory calibration of the apparatus.

12. The apparatus of claim 8, wherein the method is performed during end-user operation of the apparatus.

* * * * *